US011145897B2

(12) United States Patent
Dai et al.

(10) Patent No.: US 11,145,897 B2
(45) Date of Patent: *Oct. 12, 2021

(54) ELECTROLYTE MEMBRANE

(71) Applicant: GM Global Technology Operations LLC, Detroit, MI (US)

(72) Inventors: Fang Dai, Troy, MI (US); Mahmoud Abd Elhamid, Troy, MI (US); Mei Cai, Bloomfield Hills, MI (US); Anne M. Dailly, West Bloomfield, MI (US); Robert M. Lapierre, Bloomfield Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 191 days.

This patent is subject to a terminal disclaimer.

(21) Appl. No.: 16/265,326

(22) Filed: Feb. 1, 2019

(65) Prior Publication Data

US 2019/0165415 A1 May 30, 2019

Related U.S. Application Data

(63) Continuation-in-part of application No. 15/681,142, filed on Aug. 18, 2017, now Pat. No. 10,476,105.

(51) Int. Cl.
| | |
|---|---|
| *H01M 10/0565* | (2010.01) |
| *H01M 4/36* | (2006.01) |
| *H01M 10/0525* | (2010.01) |
| *H01M 4/76* | (2006.01) |
| *H01M 50/403* | (2021.01) |
| *H01M 50/411* | (2021.01) |
| *H01M 50/409* | (2021.01) |

(52) U.S. Cl.
CPC ....... *H01M 10/0565* (2013.01); *H01M 4/366* (2013.01); *H01M 4/76* (2013.01); *H01M 10/0525* (2013.01); *H01M 50/403* (2021.01); *H01M 50/409* (2021.01); *H01M 50/411* (2021.01)

(58) Field of Classification Search
CPC .... H01M 2/145; H01M 2/164; H01M 2/1653; H01M 4/366; H01M 4/76; H01M 10/0525; H01M 10/2565; H01M 10/0565; H01M 50/403; H01M 50/411
See application file for complete search history.

(56) References Cited

U.S. PATENT DOCUMENTS 5,256,503 A * 10/1993 Cook ............... H01M 50/411
429/249
5,648,011 A * 7/1997 Blonsky ............ H01M 6/181
252/62.2

(Continued)

*Primary Examiner* — Gregg Cantelmo
(74) *Attorney, Agent, or Firm* — Quinn IP Law

(57) ABSTRACT

Systems and methods of providing an electrolyte membrane for metal batteries are described. According to aspects of the disclosure, a method includes preparing a mixture including an electrolyte portion and a matrix precursor portion, forming an electrolyte membrane by initiating polymerization of the gel-forming precursor and the gel-forming initiator to thereby form a polymer matrix, and disposing the electrolyte membrane between an anode and a cathode. The matrix precursor portion includes a gel-forming precursor and a gel-forming initiator. The electrolyte portion is disposed substantially throughout the polymer matrix.

18 Claims, 3 Drawing Sheets

(56) References Cited

U.S. PATENT DOCUMENTS

| | | | |
|---|---|---|---|
| 6,296,783 B1 * | 10/2001 | Shindo | H01G 11/56 |
| | | | 252/500 |
| 6,358,646 B1 * | 3/2002 | Nakagawa | H01M 4/04 |
| | | | 429/212 |
| 6,420,072 B1 * | 7/2002 | Maruyama | H01M 6/181 |
| | | | 429/303 |
| 6,902,848 B1 * | 6/2005 | Izuchi | H01M 10/052 |
| | | | 429/300 |
| 2001/0038948 A1 | 11/2001 | Jacobs | |
| 2004/0043296 A1 * | 3/2004 | Lithium | H01M 10/0565 |
| | | | 429/306 |
| 2005/0053843 A1 * | 3/2005 | Takahashi | H01M 10/0525 |
| | | | 429/329 |
| 2005/0100778 A1 * | 5/2005 | Shimizu | H01M 8/1053 |
| | | | 429/483 |
| 2011/0233532 A1 * | 9/2011 | Sotzing | H01L 51/0034 |
| | | | 257/40 |
| 2013/0029057 A1 * | 1/2013 | Laksin | B05D 3/0493 |
| | | | 427/488 |
| 2015/0044517 A1 | 2/2015 | Mikhaylik et al. | |
| 2017/0301903 A1 * | 10/2017 | Choi | C09D 135/02 |

\* cited by examiner

ELECTROLYTE MEMBRANE

CROSS-REFERENCE TO RELATED APPLICATIONS

This application is a continuation-in-part of U.S. patent application Ser. No. 15/681,142, filed Aug. 18, 2017, and issued as U.S. Pat. No. 10,476,105 on Nov. 12, 2019.

INTRODUCTION

The disclosure relates to the field of electrolytes for metal batteries and, more specifically, to systems and methods of providing self-healing gel-type electrolyte composites for metal batteries.

The lithium class of batteries, such as lithium-metal, lithium-ion, or lithium-sulfur batteries, has gained popularity for various reasons, including a relatively high energy density, a general nonappearance of any memory effect when compared to other kinds of rechargeable batteries, a relatively low internal resistance, and a low self-discharge rate when not in use. Lithium-class batteries may be used as primary, or non-rechargeable, batteries and secondary, or rechargeable, batteries.

Lithium-class batteries may be used in stationary and portable devices, such as those encountered in the consumer electronic, automobile, healthcare, and aerospace industries. In the automotive industry, lithium-based batteries may be suitable for electric-based vehicles, such as hybrid electric vehicles ("HEVs"), battery electric vehicles ("BEVs"), plug-in HEVs, and extended-range electric vehicles ("EREVs"). The ability of lithium batteries to undergo repeated power cycling over their useful lifetimes makes them an attractive and dependable power source.

SUMMARY

According to aspects of the present disclosure, a method includes preparing a ternary mixture including an electrolyte portion, a matrix precursor portion, and a self-healing portion, forming a self-healing gel-electrolyte membrane by initiating polymerization of the gel-forming precursor and the gel-forming initiator to thereby form a polymer matrix, and disposing the self-healing gel-electrolyte membrane between an anode and a cathode. The self-healing portion includes a self-healing precursor that is flowable and a self-healing initiator. The matrix precursor portion includes a gel-forming precursor and a gel-forming initiator. The electrolyte portion and the self-healing portion are disposed substantially throughout the polymer matrix. The polymer matrix includes a plurality of gel-forming active sites.

According to further aspects of the present disclosure, the self-healing precursor is a cyclic ether and the self-healing initiator is a lithium-containing compound.

According to further aspects of the present disclosure, the gel-forming precursor is a branched acrylate and the gel-forming initiator is a UV initiator.

According to further aspects of the present disclosure, the electrolyte portion is an organic electrolyte.

According to further aspects of the present disclosure, the self-healing precursor is a cyclic ether having the formula $CH_2OC_2H_4O$ and the self-healing initiator is lithium bis(fluorosulfonyl)imide ("LiFSI").

According to further aspects of the present disclosure, the gel-forming precursor is a branched acrylate having a functional moiety selected from the group consisting of a carboxylic acid and an ester and the gel-forming initiator is 1,1-diphenylmethanone.

According to further aspects of the present disclosure, the electrolyte portion includes a lithium-containing salt selected from the group consisting of lithium perchlorate ($LiClO_4$), lithium hexafluoroarsenate (V) ($LiAsF_6$), lithium hexafluorophosphate ($LiPF_6$), lithium tetrafluoroborate ($LiBF_4$), lithium bis(trifluoromethanesulfonyl)imide ($LiC_2F_6NO_4S_2$) ("LiTFSI"), and combinations thereof.

According to further aspects of the present disclosure, the method further includes applying the ternary mixture to a substrate prior to forming the self-healing gel-electrolyte membrane.

According to further aspects of the present disclosure, the substrate is selected from the group consisting of the anode, the cathode, and a separator.

According to further aspects of the present disclosure, the method further includes filling, in response to a fracture formed in the polymer matrix contacting the self-healing precursor, at least a portion of the fracture with the self-healing precursor, and polymerizing, in response to the self-healing precursor contacting the self-healing initiator, the self-healing precursor to thereby inhibit propagation of the fracture through the self-healing gel-electrolyte membrane.

According to further aspects of the present disclosure, the self-healing portion is present in the ternary mixture in an amount of two parts by weight based on ten parts by weight of the ternary mixture, the matrix precursor portion is present in the ternary mixture in an amount of two parts by weight based on ten parts by weight of the ternary mixture, and the electrolyte is present in the ternary mixture in an amount of six parts by weight based on ten parts by weight of the ternary mixture.

According to further aspects of the present disclosure, at least one of the anode and the cathode includes a binder, the binder formed from a binary mixture including the matrix precursor portion and the self-healing portion, the binder binding an active material therein, the active material being selected from the group consisting of lithium-containing materials and sulfur-containing materials.

According to further aspects of the present disclosure, at least one of the anode and the cathode is an active-lithium electrode and the self-healing gel-electrolyte membrane is a coating on the at least one of the anode and the cathode to thereby prevent precipitation of transition metals on the active-lithium electrode.

According to further aspects of the present disclosure, an active material of at least one of the anode and the cathode include sulfur and the self-healing gel-electrolyte membrane prevents electrical shorts between the anode and the cathode.

According to further aspects of the present disclosure, an active material of at least one of the anode and the cathode include sulfur and the self-healing gel-electrolyte membrane prevents polysulfide shuttling without lithium nitrate present between the anode and the cathode.

According to further aspects of the present disclosure, the anode is formed from a mixture including silicon particles, the self-healing portion and the matrix precursor portion and wherein, after polymerization of the matrix precursor portion, the silicon particles are encapsulated within the polymer matrix.

According to aspects of the present disclosure, a battery cell includes an anode, a cathode, and a self-healing membrane disposed between the anode and the cathode. The self-healing membrane is prepared by a process including preparing a ternary mixture including an electrolyte portion, a matrix precursor portion, and a self-healing portion and forming a self-healing gel-electrolyte membrane by initiating polymerization of the gel-forming precursor and the gel-forming initiator to thereby form a polymer matrix. The self-healing portion includes a self-healing precursor that is flowable and a self-healing initiator. The matrix precursor portion includes a gel-forming precursor and a gel-forming initiator. The electrolyte portion and the self-healing portion are disposed substantially throughout the polymer matrix. The polymer matrix includes a plurality of gel-forming active sites. According to further aspects of the present disclosure, the process further includes applying the ternary mixture to a substrate prior to forming the self-healing gel-electrolyte membrane.

According to further aspects of the present disclosure, the self-healing precursor, in response to contact with a fracture in the self-healing gel-electrolyte membrane, fills at least a portion of the fracture, and the self-healing precursor, in response to contact with the self-healing initiator, polymerizes to thereby inhibit propagation of the fracture.

According to further aspects of the present disclosure, the self-healing precursor is a cyclic ether and the self-healing initiator is a lithium-containing compound.

According to aspects of the present disclosure, a method includes preparing a mixture including an electrolyte portion and a matrix precursor portion, forming an electrolyte membrane by initiating polymerization of the gel-forming precursor and the gel-forming initiator to thereby form a polymer matrix, and disposing the electrolyte membrane between an anode and a cathode. The matrix precursor portion includes a gel-forming precursor and a gel-forming initiator. The electrolyte portion is disposed substantially throughout the polymer matrix.

According to further aspects of the present disclosure, the gel-forming initiator is a thermal initiator.

According to further aspects of the present disclosure, the thermal initiator is selected from the group consisting of azobisisobutyronitrile, 1,1'-azobis(cyclohexanecarbonitrile), benzoyl peroxide, di-tert-butyl peroxide.

According to further aspects of the present disclosure, the thermal initiator is azobisisobutyronitrile.

According to further aspects of the present disclosure, the gel-forming initiator is a UV initiator.

According to further aspects of the present disclosure, the UV initiator is a phenone compound.

According to further aspects of the present disclosure, the UV initiator is selected from the group consisting of 1,1-diphenylmethanone, 4,4'-dihydroxybenzophenone, acetophenone, anisoin, benzil, benzoin, 2-benzyl-2-(dimethylamino)-4'-morpholinobutyrophenone, camphorquinone, 4'-ethoxyacetophenone, methybenzoylformate, 2-methyl-4'-(methylthio)-2-morpholinopropiophenone, and thioxanthen-9-one.

According to further aspects of the present disclosure, the UV initiator is 1,1-diphenylmethanone.

According to further aspects of the present disclosure, the gel-forming initiator is an electron-beam initiator.

According to further aspects of the present disclosure, the electron-beam initiator is a diaryliodonium salt or a triarylsulfonium salt.

According to further aspects of the present disclosure, the diaryliodonium salt or the triarylsulfonium salt include a counter ion selected from the group consisting of hexafluoroarsenate, hexafluoroantimonate, hexafluorophosphate, and tetrafluoroborate.

According to further aspects of the present disclosure, the electron-beam initiator is diaryliodonium hexafluoroantimonate.

According to further aspects of the present disclosure, the method further includes applying the mixture to a battery component using at least one of slurry coating, spray coating, or dip coating.

According to further aspects of the present disclosure, the method further includes applying the mixture to a battery component wherein the mixture is applied to a battery component using dip coating, the mixture coating surfaces of the battery component, and wherein a portion of the mixture is polymerized, the portion corresponding to less than all of the surfaces.

According to further aspects of the present disclosure, the gel-forming precursor is a branched acrylate.

According to further aspects of the present disclosure, the branched acrylate includes a functional moiety selected from the group consisting of a carboxylic acid and an ester.

According to further aspects of the present disclosure, the electrolyte portion includes a lithium-containing salt selected from the group consisting of lithium perchlorate ($LiClO_4$), lithium hexafluoroarsenate (V) ($LiAsF_6$), lithium hexafluorophosphate ($LiPF_6$), lithium tetrafluoroborate ($LiBF_4$), lithium bis(trifluoromethanesulfonyl)imide ($LiC_2F_6NO_4S_2$) ("LiTFSI"), and combinations thereof.

According to further aspects of the present disclosure, the method further includes applying the mixture to a substrate prior to forming the electrolyte membrane.

According to further aspects of the present disclosure, the substrate is selected from the group consisting of the anode, the cathode, and a separator.

According to aspects of the present disclosure, a battery cell includes an anode, a cathode, and an electrolyte membrane therebetween. The electrolyte membrane is formed from a mixture including a matrix precursor portion and an electrolyte portion.

According to further aspects of the present disclosure, the electrolyte membrane is a coating on a battery component.

According to further aspects of the present disclosure, mixture is polymerized after being applied to the battery component.

According to further aspects of the present disclosure, the battery component is at least one of the anode and a separator.

According to further aspects of the present disclosure, the battery component is the anode.

According to further aspects of the present disclosure, the anode is a lithium-metal anode.

According to further aspects of the present disclosure, the battery component is a separator.

According to further aspects of the present disclosure, the electrolyte membrane is a self-healing separator.

According to further aspects of the present disclosure, the mixture further includes a self-healing portion, the self-healing portion includes a self-healing precursor and a self-healing initiator, and wherein the self-healing precursor is flowable.

According to further aspects of the present disclosure, the self-healing precursor is configured to, in response to contact with a fracture in the electrolyte membrane, fill at least a portion of the fracture, and the self-healing precursor is configured to, in response to contact with the self-healing initiator, polymerize to thereby inhibit propagation of the fracture through the electrolyte membrane.

According to further aspects of the present disclosure, the self-healing precursor is a cyclic ether and the self-healing initiator is a lithium-containing compound.

According to further aspects of the present disclosure, the matrix precursor portion is free of solvent.

According to further aspects of the present disclosure, the matrix precursor portion includes a gel-forming precursor configured to form a polymer matrix and a gel-forming initiator configured to initiate polymerization of the gel-forming precursor.

According to further aspects of the present disclosure, the gel-forming precursor is a branched acrylate.

According to further aspects of the present disclosure, the gel-forming initiator is a thermal initiator.

According to further aspects of the present disclosure, the thermal initiator is selected from the group consisting of azobisisobutyronitrile, 1,1'-azobis(cyclohexanecarbonitrile), benzoyl peroxide, di-tert-butyl peroxide.

According to further aspects of the present disclosure, the gel-forming initiator is a UV initiator.

According to further aspects of the present disclosure, the UV initiator is selected from the group consisting of 1,1-diphenylmethanone, 4,4'-dihydroxybenzophenone, acetophenone, anisoin, benzil, benzoin, 2-benzyl-2-(dimethylamino)-4'-morpholinobutyrophenone, camphorquinone, 4'-ethoxyacetophenone, methybenzoylformate, 2-methyl-4'-(methylthio)-2-morpholinopropiophenone, thioxanthen-9-one.

According to further aspects of the present disclosure, the gel-forming initiator is an electron-beam initiator.

According to further aspects of the present disclosure, the electron-beam initiator is selected from the group consisting of diaryliodonium salts and triarylsulfonium salts.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

DETAILED DESCRIPTION

Figure 1:
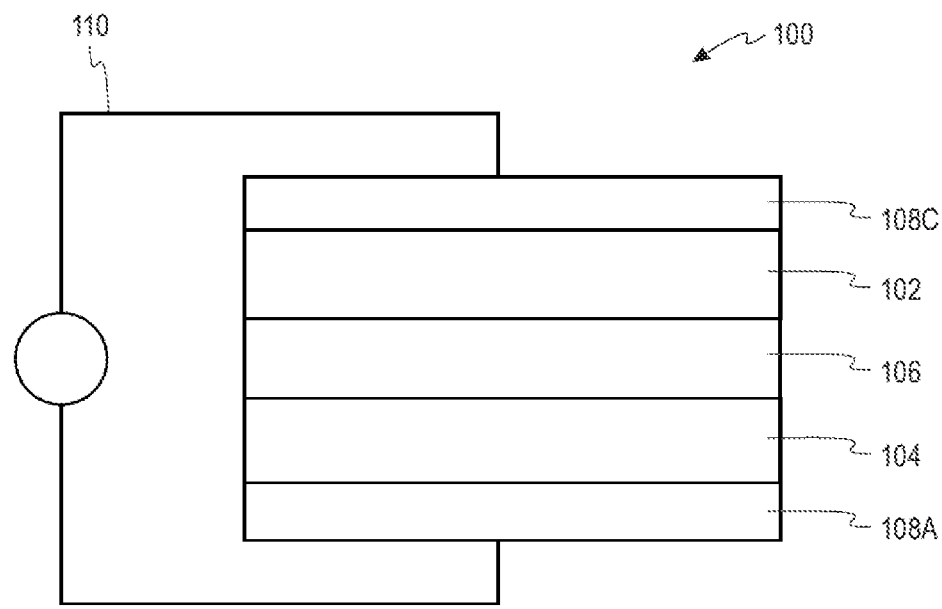
FIG. 1 illustrates a schematic battery cell having a self-healing gel-electrolyte membrane, according to aspects of the present disclosure.

FIG. 1 illustrates a schematic battery cell 100. The battery cell 100 includes a cathode 102, an anode 104, and an electrolyte membrane 106 disposed between the cathode 102 and the anode 104. In some aspects, the anode 104 is a lithium-class anode. For example, active material of the anode 104 may include intercalated lithium. In some aspects, the active material of the anode 104 is a lithium-sulfide anode compound, such as those provided by U.S. Patent Publication No. 2015/0221935 to Zhou and U.S. Patent Publication No. 2015/0162583 to Dadheech, each of which is hereby incorporated by reference in its entirety. The active material of the cathode 102 is selected to facilitate an electrochemical reaction of the anode 104. In some aspects, the active material of the cathode 102 is copper. In some aspects, the active material of the cathode 104 is a sulfur-containing material.

Beneficially, the electrolyte membrane 106 may improve operable lifetime of battery packs implementing the battery cells 100 by inhibiting dendrite formation in lithium-metal batteries and polysulfide shuttling in lithium-sulfur batteries. Further, the electrolyte membrane 106 as disclosed herein is compatible with most electrode active materials and liquid phase electrolytes. Moreover, the electrolyte membrane 106 disclosed herein may reduce manufacturing costs of the battery cell 100 by avoiding costs of metal catalyst initiators such as rare metal catalysts. Additionally, the electrolyte membrane 106 disclosed herein may be implemented as a binder for the anode 104 and cathode 102 in lithium batteries. What is more, the electrolyte membrane 106 may also be implemented as a coating for active electrodes such as the anode 104 to prevent transition-metal deposition when using a cathode 102 based on transition-metal oxides. Moreover, the electrolyte membrane 106 could be used as a coating in power cells to prevent self-discharge due to the reaction or oxidation of the electroactive material, such as active lithium titanate ("LTO"), which may be used as an anode material with the electrolyte. The electrolyte membrane 106 may also be used to form a shell around silicon particles used in high-energy-density lithium batteries that use silicon as an active material for the anode 104.

The electrolyte membrane 106 is formed from a binary mixture that includes an electrolyte portion and a matrix precursor portion. The electrolyte portion is configured to allow for ionic transfer through the electrolyte membrane 106. In some aspects, the electrolyte portion is an organic electrolyte, such as a lithium-containing salt, in an organic solvent. In some aspects, the lithium-containing salt is selected from the group consisting of lithium bis(trifluoromethanesulfonyl)imide ($LiC_2F_6NO_4S_2$) ("LiTFSI"), lithium perchlorate ($LiClO_4$), lithium hexafluoroarsenate ($LiAsF_6$), lithium tetrafluoroborate ($LiBF_4$), lithium hexafluorophosphate ($LiPF_6$), combinations thereof, and the like. In some aspects, the organic solvent or cosolvent is a carbonate-group solvent. For example, the organic solvent or cosolvent may be ethylene carbonate (($CH_2O)_2CO$), propylene carbonate ($CH_3C_2H_3O_2CO$), diethyl carbonate ($OC(OCH_2CH_3)_2$), combinations thereof, and the like.

The matrix precursor portion is configured to form a polymer matrix that defines a structure of the self-healing gel-electrolyte membrane 106. The matrix precursor portion includes a gel-forming precursor and a gel-forming initiator. Beneficially, in some aspects, the matrix precursor portion is free of solvent such that formation of the polymer matrix defining the electrolyte membrane 106 occurs without solvent evaporation.

The gel-forming precursor is configured to form the polymer of the polymer matrix. In some aspects, the gel-forming precursor is a branched precursor. In some aspects, the gel-forming precursor is a branched acrylate having a functional moiety selected from the group consisting of a carboxylic acid and an ester.

The gel-forming initiator is configured to initiate polymerization of the gel-forming precursor in response to reaching predetermined physical conditions. In some aspects, the gel-forming initiator is a UV initiator that initiates polymerization of the gel-forming precursor in response to being exposed to UV light. For example, the UV initiator may be a phenone compound. In some aspects, the UV initiator is selected from the group consisting of 1,1-diphenylmethanone ("benzophenone"), 4,4'-dihydroxybenzophenone, acetophenone, anisoin, benzil, benzoin, 2-benzyl-2-(dimethylamino)-4'-morpholinobutyrophenone, camphorquinone, 4'-ethoxyacetophenone, methybenzoylformate, 2-methyl-4'-(methylthio)-2-morpholinopropiophenone, thioxanthen-9-one, combinations thereof, and the like. Beneficially, UV initiators provide for polymerization of the gel-forming precursor that may be quickly initiated or halted.

In some aspects, the gel-forming initiator is an electron-beam initiator that initiates polymerization of the gel-forming precursor in response to being exposed to an electron beam. For example, the electron-beam initiator may be selected from the group consisting of diaryliodonium salts and triarylsulfonium salts. In some aspects, the diaryliodonium salts and triarylsulfonium salts include counter ions of hexafluoroarsenate, hexafluoroantimonate, hexafluorophosphate, tetrafluoroborate, combinations thereof, and the like.

In some aspects, the gel-forming initiator is a thermal initiator that initiates polymerization of the gel-forming precursor in response to being exposed to elevated temperatures. For example, the thermal initiator may be selected from the group consisting of azobisisobutyronitrile, 1,1'-azobis(cyclohexanecarbonitrile), benzoyl peroxide, di-tert-butyl peroxide, combinations thereof, and the like. Beneficially, thermal initiators may be used to provide for polymerization of the gel-forming precursor when disposed inside of a product or when a view of the gel-forming precursor is obscured.

In some aspects, the electrolyte membrane 106 is a self-healing gel-electrolyte membrane. Beneficially, the self-healing gel-electrolyte membrane may additionally inhibit thermal runaway events resulting from, for example, a puncture to the battery cell 100. The self-healing gel-electrolyte membrane is formed from a ternary mixture that includes the electrolyte portion, the matrix precursor portion, and a self-healing portion.

The self-healing portion includes a self-healing precursor and a self-healing initiator. The self-healing portion is dispersed in the self-healing gel-electrolyte membrane such that a fracture in the self-healing gel-electrolyte membrane will contact the self-healing precursor and the self-healing initiator. The self-healing precursor and the self-healing initiator are selected to inhibit propagation of a fracture through the polymer matrix after contact between the self-healing precursor and the self-healing initiator.

The self-healing precursor and/or the self-healing initiator are maintained within deposits throughout the polymer matrix. In some aspects, the deposits are within well-defined containment structures such as microspheres or tubular structures having a relatively uniform size distribution. In some aspects, the deposits of the self-healing precursor and/or the self-healing initiator are formed because the self-healing precursor and/or self-healing initiator are contained within well-defined containment structures formed by a separate encapsulant. In some aspects, the deposits of the self-healing precursor and/or the self-healing initiator are formed because the self-healing precursor and/or the self-healing initiator are immiscible within the ternary mixture.

As a fracture propagates through the polymer matrix, the fracture will contact the self-healing precursor. The self-healing precursor is configured to be flowable such that, in response to contact with the fracture in the self-healing gel-electrolyte membrane 106, the self-healing precursor fills at least a portion of the fracture. Further, the self-healing precursor is configured to polymerize in response to contact with the self-healing initiator to thereby inhibit propagation of the fracture. The distribution and amount of self-healing precursor within the polymer matrix are selected to inhibit fractures from propagating further than a certain average distance. For example, an increased load of the self-healing precursor reduces the statistical distance a fracture may propagate through the self-healing gel-electrolyte membrane 106 before the fracture would contact a deposit of the self-healing precursor.

In some aspects, the self-healing portion is substantially uniformly distributed throughout the polymer matrix. In some aspects, the self-healing portion is loaded more heavily toward the edges of the polymer matrix that face the cathode 102 or the anode 104. Beneficially, such a non-uniform distribution may inhibit propagation of fractures from the edges of the self-healing gel-electrolyte membrane 106 while reducing the overall amount of self-healing portion required to inhibit fracture propagation.

In some aspects, the self-healing precursor is selected such that the self-healing precursor and polymers formed therefrom may attach to gel-forming active sites within the polymer matrix. Beneficially, such an attachment may increase the strength of the self-healed portion and provide greater resistance against further propagation.

In some aspects, the self-healing precursor is selected to polymerize through a cationic ring-opening polymerization process. In some aspects, the self-healing precursor is a cyclic molecule capable of polymerization. In some aspects, the self-healing precursor is a cyclic ether. In some aspects, the self-healing precursor is cyclic ether having the formula $CH_2OC_2H_4O$.

In some aspects, the self-healing initiator is a lithium-containing compound. In some aspects, the self-healing initiator is flowable such that, upon contact with the fracture, the self-healing initiator fills at least a portion of the fracture. Beneficially, a flowable self-healing initiator may increase the rate of polymerization through increased mixing with the self-healing precursor. In some aspects, the self-healing initiator is a lithium imide compound. In some aspects, the self-healing initiator is lithium bis(fluorosulfonyl)imide. In some aspects, the self-healing precursor is contained within an inert microcapsule and the self-healing initiator is a component within the electrolyte portion.

In some aspects, the battery cell 100 further includes an anode-side current collector 108A and a cathode-side current collector 108C. The anode-side current collector 108A may be disposed adjacent the anode 104 and may be configured to balance current distribution and increase charge transfer across the anode 104. The cathode-side current collector 108C may be disposed adjacent the cathode 102 and may be configured to balance current distribution and increase charge transfer across the cathode 102. An external circuit 110 may electrically couple the anode-side current collector 108A to the cathode-side current collector 108C.

The external circuit 110 may allow current to flow between the anode-side current collector 108A and the cathode-side current collector 108C.

Figure 5:
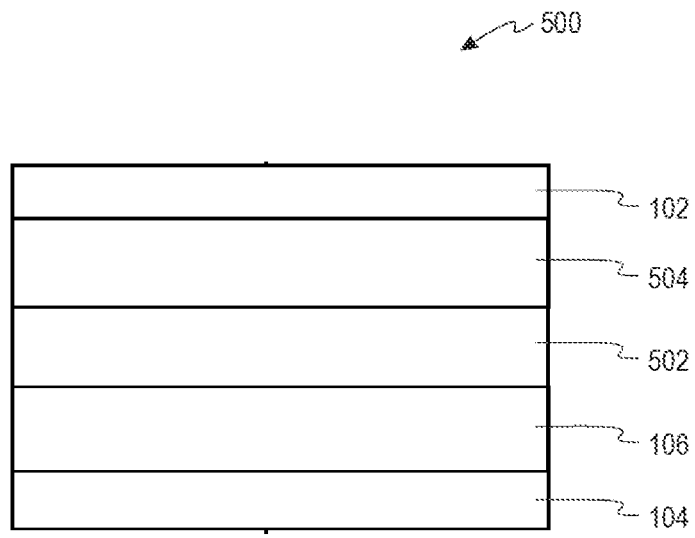
FIG. 5 illustrates a schematic battery cell, according to further aspects of the present disclosure.

FIG. 5 illustrates a schematic battery cell 500 including the cathode 102, the anode 104, the electrolyte membrane 106, and a separator 502. The separator 502 is an electrically insulating and ion-permeable membrane disposed between the cathode 102 and the anode 104. In some aspects, the separator 502 is a polymer film such as polyethylene, polypropylene, poly(tetrafluoroethylene), polyvinyl chloride, combinations thereof, and the like. The separator 502 may further include inorganic fillers such as titanium dioxide, silicon dioxide, aluminum oxides, zeolite, lithium niobate, lithium tantalate, combinations thereof, and the like.

The separator 502 is disposed between the cathode 102 and the anode 104. The electrolyte membrane 106 is disposed between the separator 502 and the anode 104, while another electrolyte 504 is disposed between the separator 502 and the cathode 102. The electrolyte 504 may be a liquid, gel, or solid electrolyte. In some aspects, the electrolyte 504 is a second electrolyte membrane 106. In some aspects, the membrane 106 is formed directly on an anode-side of the separator 502 as a coating and is then brought into contact with the anode 102. In some aspects, the membrane 106 is formed directly on the anode 104 as a coating and is then brought into contact with the separator 502. In some aspects, the membrane 106 is formed in situ between and contacting both the anode 104 and the separator 502.

In some aspects, the separator 502 is formed from a binary mixture including the matrix precursor portion and the electrolyte portion. In some aspects, the separator 502 is a self-healing separator 502 formed from the ternary mixture including the self-healing portion, the matrix precursor portion, and the electrolyte portion.

Figure 6:
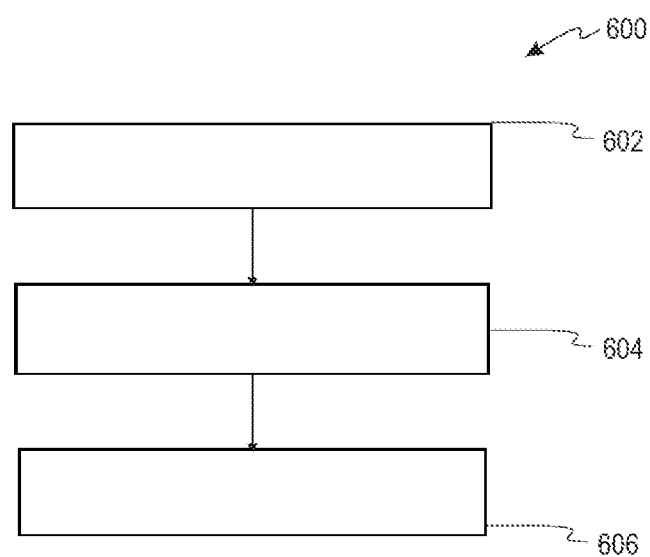
FIG. 6 illustrates a schematic method according to further aspects of the present disclosure.

FIG. 6 illustrates a method 600 of providing an electrolyte membrane 106 for a battery cell 100. The method includes preparing 602 a mixture including the electrolyte portion and the matrix precursor portion, applying 604 the mixture to a substrate, forming 606 the electrolyte membrane 106 on the substrate via polymerization of the matrix precursor portion.

In some aspects, the mixture is in the form of a slurry which is coated onto the substrate. In some aspects, the mixture is spray coated onto the substrate. In some aspects, the mixture is contained in a pool, and the substrate is dip coated by at least partially submerging a surface of the substrate into the pool.

Forming 606 the electrolyte membrane 106 may include, for example, polymerization via thermal initiation, UV initiation, electron-beam initiation, or combinations thereof. Beneficially, while dip-coating of the substrate may provide the mixture on multiple surfaces of the substrate, thermal, UV, or electron-beam initiation of polymerization may be used to selectively polymerize a portion of the mixture (for example, polymerizing only the mixture on a single face of the substrate) while the remaining, unpolymerized portion of the mixture may be removed. Beneficially, the unpolymerized portion may serve as a protective layer for the substrate during certain processing procedures. For example, the unpolymerized portion may protect the substrate when exposed to the atmosphere.

Figure 2:
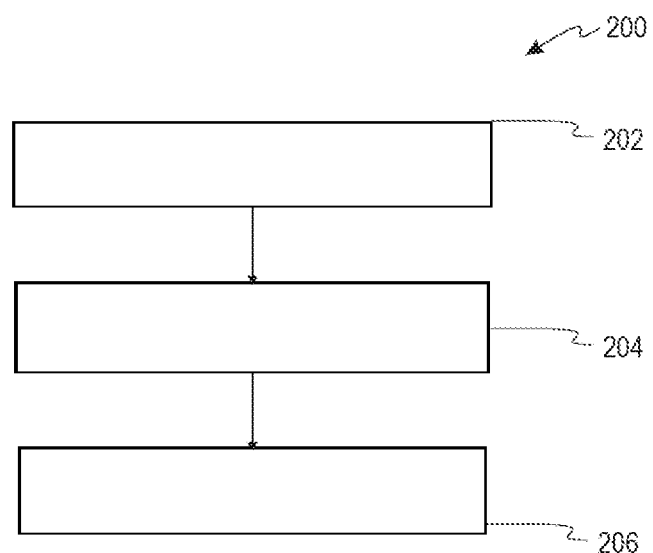
FIG. 2 illustrates a schematic method according to aspects of the present disclosure.

Referring now to FIG. 2, a method 200 of providing a self-healing gel-electrolyte membrane for a battery cell 100 is shown. The method 200 includes preparing 202 a ternary mixture including the electrolyte portion, the matrix precursor portion, and the self-healing portion, forming 204 the self-healing gel-electrolyte membrane by initiating polymerization of the gel-forming precursor and the gel-forming initiator, and disposing 206 the self-healing gel-electrolyte membrane between the cathode 102 and the anode 104.

In some aspects, initiating polymerization of the gel-forming precursor and the gel-forming initiator includes at least one of thermal initiation, UV initiation, electron-beam initiation, or combinations thereof. Beneficially, use of thermal, UV, or electron-beam initiation provides for in situ formation of the membrane 106. Such in situ formation, as well as the matrix precursor portion and formation of the polymer matrix being free of solvent optimizes performance of lithium-metal anodes by obviating surface modification of the lithium-metal anode prior to contact with and/or formation of the membrane 106.

The self-healing portion includes a self-healing precursor that is flowable and a self-healing initiator. The matrix precursor portion includes a gel-forming precursor and a gel-forming initiator. Initiating polymerization of the gel-forming precursor and the gel-forming initiator thereby forms a polymer matrix. The electrolyte portion and the self-healing portion are substantially throughout the polymer matrix. The polymer matrix includes a plurality of gel-forming active sites.

In some aspects, the ternary mixture is prepared by mixing the electrolyte portion, the matrix precursor portion, and the self-healing portion together in solution. In some aspects, the self-healing portion is added to a mixture of the electrolyte portion and the matrix precursor portion immediately prior to initiating curing of the matrix precursor portion to inhibit polymerization of the self-healing precursor. In some aspects, the electrolyte portion, the matrix precursor portion, and one of the self-healing precursor and the self-healing initiator are mixed together while the other of the self-healing precursor and the self-healing initiator is added to the mixture immediately prior to initiating curing of the matrix precursor portion to inhibit polymerization of the self-healing precursor.

The ternary mixture may be applied to a substrate prior to forming the self-healing gel-electrolyte membrane 106. In some aspects, the substrate is a removable backer. For example, the ternary mixture may be deposited onto the removable backer for curing of the polymer matrix. After polymerization of the matrix precursor has proceeded to a predetermined extent that the self-healing gel-electrolyte membrane 106 is freestanding and manipulatable without damage, the removable backer is separated from the self-healing gel-electrolyte membrane 106. The self-healing gel-electrolyte membrane 106 may then be placed between the anode and the cathode of the battery cell. Placement of the self-healing gel-electrolyte membrane 106 may be achieved through abutting the self-healing gel-electrolyte membrane 106 with one or more of the anode 104 or the cathode 102.

In some aspects, the substrate is selected from the group consisting of the anode 104, the cathode 102, and the separator. For example, the ternary mixture may be deposited onto the cathode 102 for curing of the polymer matrix. In some aspects, another battery component, such as the anode 104 or the separator, is applied to the ternary mixture opposite the cathode prior to curing of the polymer matrix. In some aspects, another battery component, such as the anode or the separator, is applied to the ternary mixture after polymerization of the polymer matrix has proceeded to a predetermined extent that the self-healing gel-electrolyte membrane 106 is freestanding and manipulatable without damage.

In some aspects, at least one of the anode 104 and the cathode 102 includes a binder which binds an active material therein. The binder may be formed from a binary mixture including the matrix precursor portion and the self-healing portion. In some aspects, the active material is selected from the group consisting of lithium-containing materials and sulfur-containing materials.

In some aspects, at least one of the anode 104 and the cathode 102 is an active-lithium electrode and the self-healing gel-electrolyte membrane is a coating on the at least one of the anode 104 and the cathode 102 to thereby prevent precipitation of transition metals on the active-lithium electrode.

In some aspects, the active material of at least one of the anode 104 and the cathode 102 includes sulfur and the self-healing gel-electrolyte membrane prevents electrical shorts between the anode 104 and the cathode 102.

In some aspects, the active material of at least one of the anode 104 and the cathode 102 include sulfur and the self-healing gel-electrolyte membrane prevents polysulfide shuttling without lithium nitrate present between the anode 104 and the cathode 102.

In some aspects, the anode 104 is formed from a mixture including silicon particles, the self-healing portion, and the matrix precursor portion. After polymerization of the matrix precursor portion for the anode 104, the silicon particles are encapsulated within the polymer matrix. Beneficially, the self-healing portion within the polymer matrix prevents damage to the polymer matrix from thermal expansion and contraction of the silicon particles.

For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation." Additionally, the singular terms "a," "an," and "the" include plural referents unless context clearly indicates otherwise.

While the best modes for carrying out the disclosure have been described in detail, those familiar with the art to which this disclosure relates will recognize various alternative designs and embodiments for practicing the disclosure within the scope of the appended claims.

EXAMPLES

Example 1

A self-healing gel-electrolyte membrane is formed from a ternary mixture of an electrolyte portion, a matrix precursor portion, and a self-healing portion. The self-healing portion includes a self-healing precursor that is a cyclic ether having the formula $CH_2OC_2H_4O$ and a self-healing initiator that is lithium bis(fluorosulfonyl)imide. The matrix precursor portion includes a gel-forming precursor of a branched acrylate having a carboxylic acid as the functional moiety and a gel-forming initiator of 1,1-diphenylmethanone. The electrolyte portion is an organic electrolyte including lithium hexafluorophosphate in a cosolvent combination of ethylene carbonate and dimethyl carbonate, the ethylene carbonate being 50% by volume on a basis of the cosolvents and the dimethyl carbonate being 50% by volume on a basis of the cosolvents. The electrolyte portion is 60 percent by weight on a basis of the total weight of the ternary mixture. The matrix precursor portion is 20 percent by weight on a basis of the total weight of the ternary mixture. The self-healing portion is 20 percent by weight on a basis of the total weight of the ternary mixture.

The battery cell is a half-cell configuration of a lithium anode, a liquid electrolyte layer, a self-healing gel-electrolyte membrane, and a copper cathode. The lithium anode is adjacent the liquid electrolyte layer. The liquid electrolyte layer is disposed between the lithium anode and the self-healing gel-electrolyte membrane. The self-healing gel-electrolyte membrane is disposed between the liquid electrolyte layer and the copper cathode. The composition of the liquid electrolyte layer is 1 molar lithium hexafluorophosphate in ethylene carbonate and dimethyl carbonate, the ethylene carbonate being 50% by volume on a basis of the cosolvents and the dimethyl carbonate being 50% by volume on a basis of the cosolvents.

Figure 3:
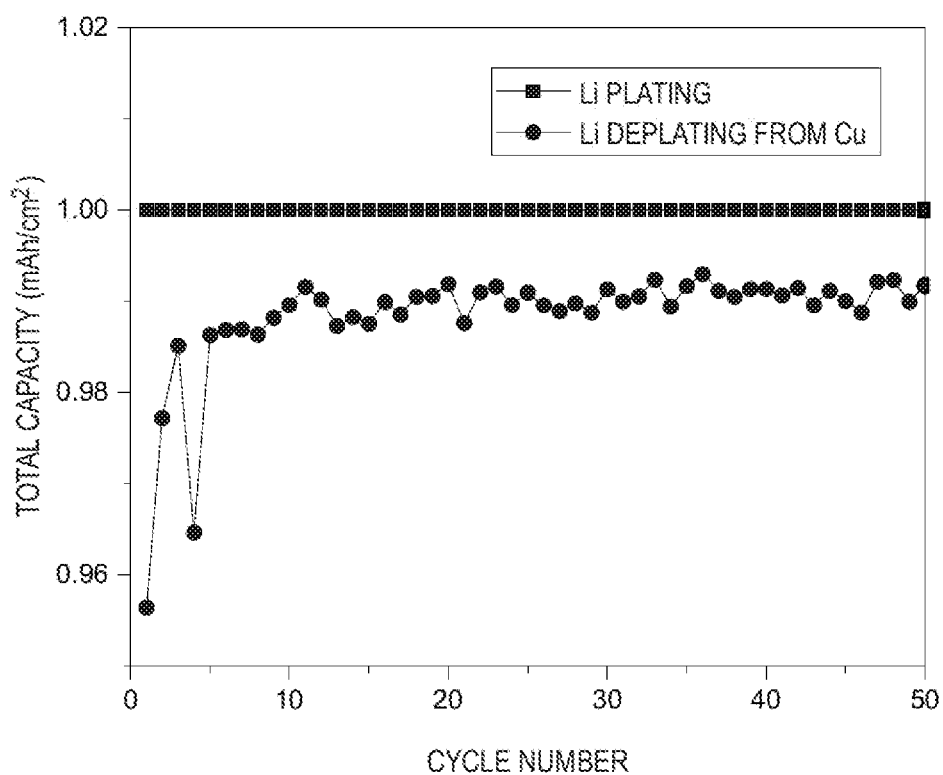
FIG. 3 illustrates a schematic plot of total capacitance by cycle number for an example battery cell.

After assembly, the battery cell is tested for total capacity over charge-discharge cycles. The charge cycle is run to 1 $mAh/cm^2$ at a rate of 0.25 $mA/cm^2$ and the discharge cycle is run at a rate of 0.25 $mA/cm^2$. FIG. 3 is a plot of total capacity for each cycle obtained. As can be seen, the total capacity has an initial coulombic efficiency of less than 96%. As the cycles increase, the coulombic efficiency increases to greater than 99%.

Example 2

A self-healing gel-electrolyte membrane is formed from a ternary mixture of an electrolyte portion, a matrix precursor portion, and a self-healing portion. The self-healing portion includes a self-healing precursor that is a cyclic ether having the formula $CH_2OC_2H_4O$ and a self-healing initiator that is lithium bis(fluorosulfonyl)imide. The matrix precursor portion includes a gel-forming precursor of a branched acrylate having a carboxylic acid as the functional moiety and a gel-forming initiator of 1,1-diphenylmethanone. The electrolyte portion is an organic electrolyte including lithium hexafluorophosphate in a cosolvent combination of ethylene carbonate and dimethyl carbonate, the ethylene carbonate being 50% by volume on a basis of the cosolvents and the dimethyl carbonate being 50% by volume on a basis of the cosolvents. The electrolyte portion is 60 percent by weight on a basis of the total weight of the ternary mixture. The matrix precursor portion is 20 percent by weight on a basis of the total weight of the ternary mixture. The self-healing portion is 20 percent by weight on a basis of the total weight of the ternary mixture.

The battery cell is a half-cell configuration of a lithium anode, a self-healing gel-electrolyte membrane, a liquid electrolyte layer, and a sulfur-containing cathode. The lithium anode is adjacent the self-healing gel-electrolyte membrane. The self-healing gel-electrolyte membrane is disposed between the lithium anode and the liquid electrolyte layer. The liquid electrolyte layer is disposed between the self-healing gel-electrolyte membrane and the copper cathode. The composition of the liquid electrolyte layer is 1 molar LiTFSI in 1,3-dioxolane ("DOL") and 1,2-dimethoxyethane ("DME"), the DOL being 50% by volume on a basis of the cosolvents and the DME being 50% by volume on a basis of the cosolvents. Notably, the battery cell of this example does not include lithium nitrate ($LiNO_3$). Beneficially, the self-healing gel-electrolyte membrane inhibits overcharge conditions caused by polysulfide redox shutting without additional inhibitors such as lithium nitrate. For example, a similar lithium-sulfur battery lacking both a self-healing gel-electrolyte membrane and lithium nitrate suffers from polysulfide shuttling and overcharge until the electrolyte dries out while the example battery cell continued to function and did not show effects of polysulfide shuttling.

Figure 4:
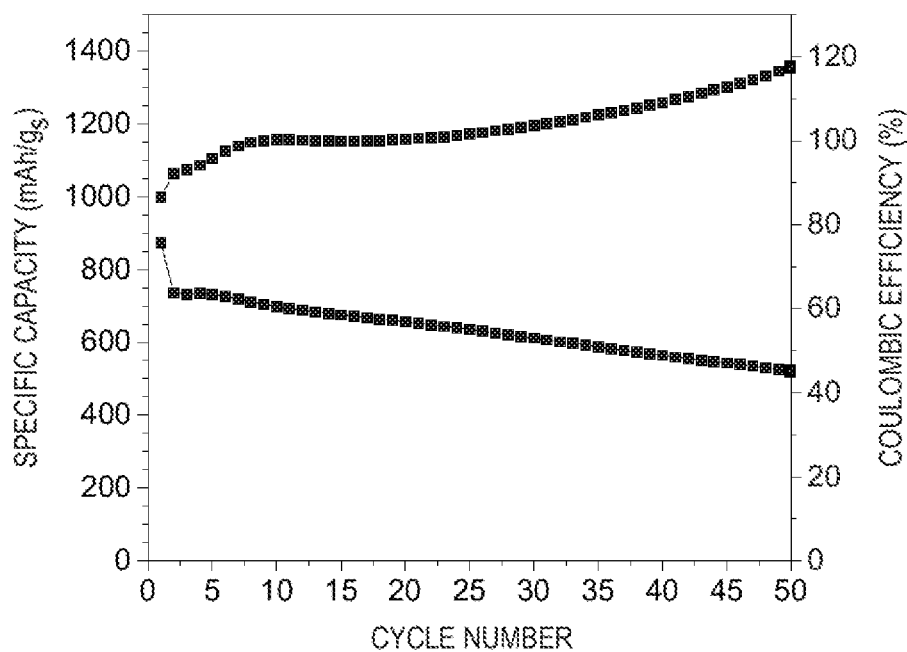
FIG. 4 illustrates a schematic plot of specific capacity and coulombic efficiency by cycle number for another example battery cell.

After assembly, the battery cell is tested for total capacity over charge-discharge cycles. The charge cycle is run to 1 $mAh/cm^2$ at a rate of 0.25 $mA/cm^2$ and the discharge cycle is run at a rate of 0.25 $mA/cm^2$. FIG. 4 is a plot of specific capacity and coulombic efficiency by cycle number. As can be seen, a coulombic efficiency of greater than 99% was reached after a few cycles with a specific capacity of about 900 mAh/g.

What is claimed is:

1. A method comprising:
preparing a mixture including:
an electrolyte portion;
a matrix precursor portion including a gel-forming precursor and a gel-forming initiator; and
a self-healing portion including a self-healing precursor that is flowable and a self-healing initiator;
applying the mixture to surfaces of a battery component;
after applying, selectively polymerizing the mixture to form a self-healing gel-electrolyte membrane on less than all of the surfaces;
wherein selectively polymerizing includes initiating polymerization of the gel-forming precursor and the gel-forming initiator to thereby form a polymer matrix, wherein the electrolyte portion and the self-healing portion are disposed substantially throughout the polymer matrix and the polymer matrix includes a plurality of gel-forming active sites;
wherein the polymer matrix has a first edge and a second edge opposite the first edge, and further wherein the self-healing portion is non-uniformly distributed throughout the polymer matrix such that the self-healing portion is loaded more heavily towards the first edge and the second edge; and
after selectively polymerizing, removing a remaining, unpolymerized portion of the mixture from the battery component.

2. The method of claim 1, wherein the gel-forming initiator is a thermal initiator.

3. The method of claim 2, wherein the thermal initiator is selected from the group consisting of azobisisobutyronitrile, 1,1'-azobis(cyclohexanecarbonitrile), benzoyl peroxide, and di-tert-butyl peroxide.

4. The method of claim 2, wherein the thermal initiator is azobisisobutyronitrile.

5. The method of claim 1, wherein the gel-forming initiator is a UV initiator.

6. The method of claim 5, wherein the UV initiator is a phenone compound.

7. The method of claim 5, wherein the UV initiator is selected from the group consisting of 1,1-diphenylmethanone, 4,4'-dihydroxybenzophenone, acetophenone, anisoin, benzil, benzoin, 2-benzyl-2-(dimethylamino)-4'-morpholinobutyrophenone, camphorquinone, 4'-ethoxyacetophenone, methybenzoylformate, 2-methyl-4'-(methylthio)-2-morpholinopropiophenone, and thioxanthen-9-one.

8. The method of claim 5, wherein the UV initiator is 1,1-diphenylmethanone.

9. The method of claim 1, wherein the gel-forming initiator is an electron-beam initiator.

10. The method of claim 9, wherein the electron-beam initiator is a diaryliodonium salt or a triarylsulfonium salt.

11. The method of claim 10, wherein the diaryliodonium salt or the triarylsulfonium salt includes a counter ion selected from the group consisting of hexafluoroarsenate, hexafluoroantimonate, hexafluorophosphate, and tetrafluoroborate.

12. The method of claim 9, wherein the electron-beam initiator is diaryliodonium hexafluoroantimonate.

13. The method of claim 1, wherein applying the mixture includes at least one of slurry coating, spray coating, or dip coating.

14. The method of claim 1, wherein the gel-forming precursor is a branched acrylate.

15. The method of claim 14, wherein the branched acrylate includes a functional moiety selected from the group consisting of a carboxylic acid and an ester.

16. The method of claim 14, wherein the electrolyte portion includes a lithium-containing salt selected from the group consisting of lithium perchlorate ($LiClO_4$), lithium hexafluoroarsenate (V) ($LiAsF_6$), lithium hexafluorophosphate ($LiPF_6$), lithium tetrafluoroborate ($LiBF_4$), lithium bis(trifluoromethanesulfonyl)imide ($LiC_2F_6NO_4S_2$) ("LiTFSI"), and combinations thereof.

17. The method of claim 1, wherein the battery component is selected from the group consisting of an anode, a cathode, and a separator.

18. A battery cell comprising:
an anode;
a cathode spaced apart from the anode; and
a self-healing gel-electrolyte membrane formed by the method of claim 1, wherein the battery component is selected from the group consisting of the anode, the cathode, and a separator disposed between the anode and the cathode.

* * * * *